Sept. 22, 1970         L. D. MALLORY                3,530,022
           METHOD OF MAKING INTERCHANGEABLE MEDALLIONS
                  FOR PLASTIC MAT-FORMING MOLDS
Filed Jan. 17, 1966                           2 Sheets-Sheet 1
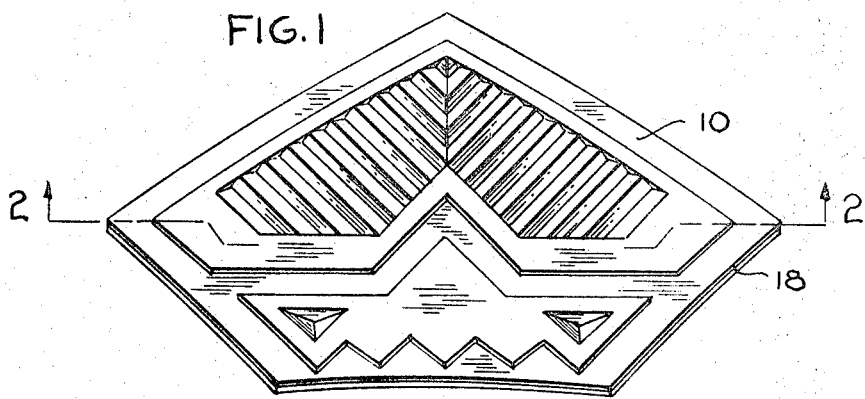
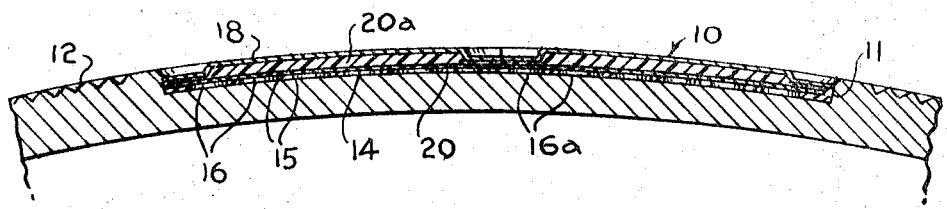
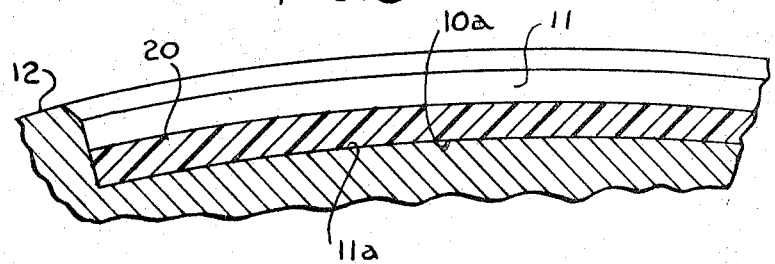
INVENTOR.
Lamont D. Mallory
BY William Cleland
                Attorney Sept. 22, 1970
L. D. MALLORY
3,530,022
METHOD OF MAKING INTERCHANGEABLE MEDALLIONS
FOR PLASTIC MAT-FORMING MOLDS
Filed Jan. 17, 1966
2 Sheets-Sheet 2
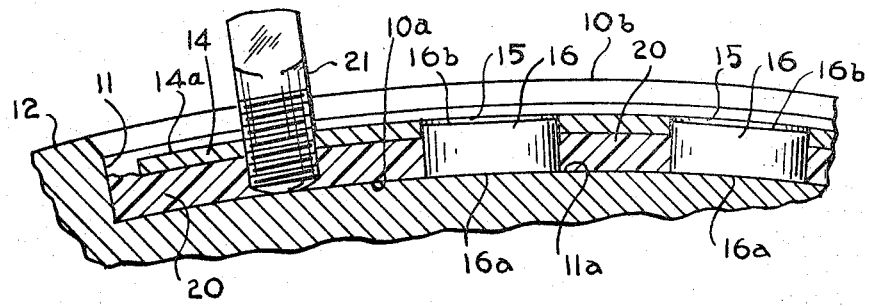
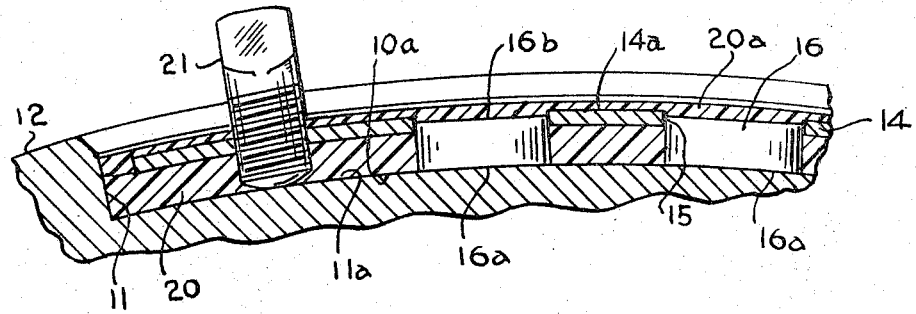
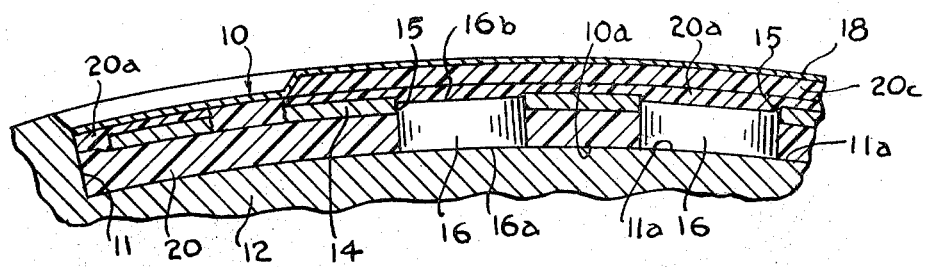
INVENTOR.
Lamont D. Mallory
BY William Cleland
Attorney United States Patent Office 3,530,022
Patented Sept. 22, 1970

3,530,022
METHOD OF MAKING INTERCHANGEABLE MEDALLIONS FOR PLASTIC MAT-FORMING MOLDS
Lamont D. Mallory, Doylestown, Ohio, assignor, by mesne assignments, to The General Tire & Rubber Company, Akron, Ohio, a corporation of Ohio
Filed Jan. 17, 1966, Ser. No. 534,929
Int. Cl. B28b 7/10; B29c 7/00
U.S. Cl. 156—245                6 Claims

ABSTRACT OF THE DISCLOSURE

Method and means for providing matrix of mold for making plastic mats with quickly interchangeable medallion insert, without use of screws or other separable attaching devices. Complete medallion inserts economically and accurately formed directly in shallow recess in matric surface to mate with mat design in matrix and to affix plurality of permanent magnets in each insert magnetically attracted to metal surface of matrix. Medallion inserts, as for selectively variable, company brand indicia on like mat designs, rapidly interchangeable by forcible release of the magnetic attachment of insert magnets to matrix surface.

---

This invention relates generally to matrices for molding plastic mats, and more particularly relates to an improved method of making interchangeable medallions or like inserts for drum-type, mat-forming molds, and to improved medallion plates produced by the method for use on such drum-type molds for continuous production of vehicle floor mats, for example.

Heretofore, in the manufacture of plastic floor mats for automobiles, it has been the practice to provide some kind of medallion design to identify the mats as to source or use of the same. Generally, the mold parts for the medallions were made integral with the mat design portions of the mold and, accordingly, new molds had to be made for mats having the same general design configurations, but having different medallion designs. In any event, there was no satisfactory way to interchange separate medallions in the molds without causing expensive delays in production.

One object of the present invention is to provide a drum-type mold, for example, having a given mat design relief, including an improved insert plate which can be interchanged with other plates having different designs thereon in a matter of seconds, and without requiring use of screws, bolts, or other time-consuming fastening means.

Another object of the invention is to provide an improved medallion or like plate which can be installed or removed with respect to the mat mold without use of holes, protrusions, or other means which would detract from the requisite ornamental design relief of the mold.

Another object of the invention is to provide an improved simple method for making medallions of the character described in which the mat mold itself may be used for molding the improved medallion or insert plate therein, with resultant economical elimination of need for providing separate mold means for making the medallion plate.

These and other objects of the invention will be manifest from the following brief deescription and the accompanying drawings:

FIG. 1 is a perspective view of a medallion plate made in accordance with the method of the invention.

FIG. 2 is an enlarged fragmentary cross-section taken transversely through a drum-type mold, and showing the improved medallion plate in cross-section as viewed on the line 2—2 of FIG. 1 but magnetically attached to the mold.

FIG. 3 is a further enlarged fragmentary cross-section, corresponding in part to FIG. 2, and showing an initial step in the method of producing the medallion plate of the invention.

FIG. 4 is a view corresponding to FIG. 3, illustrating an intermediate step in the method of making the medallion plate.

FIG. 5 is a further enlarged fragmentary view corresponding to FIG. 4, illustrating a further intermediate step in the method of the invention.

FIG. 6 is a fragmentary view, corresponding to FIG. 5, illustrating a final step in the method of the invention.

Referring particularly to FIGS. 1 and 2 of the drawings, there is illustrated an interchangeable magnetic medallion plate or medallion insert 10, made by the method of the invention to be described later, complementally received in a recess 11 for the same provided in the drum-type mold 12 of the type shown in U.S. Pat. 3,256,356, and designed for use in continuously producing flat mats from polyvinyl chloride sheet material.

To this end, the medallion insert 10 may be formed of rigid plastic material, such as epoxy resin loaded with fine aluminum powder, and within which is integrally centrally embedded a rigid plate 14 of metal, such as cold rolled steel, of approximately the size and shape of the medallion insert, but slightly smaller and much thinner. An outer design relief facing 18 of the medallion insert 10, made in known manner, as by chrome-plating a preformed electroplated copper shell having suitable curvate shape, is affixed to the outer side of medallion insert 10 as by means of metallized epoxy resin cement.

The rigid plate 14 may have therein a multiplicity of closely spaced holes 15, 15 through which extend a series of disc-type permanent magnets 16, 16 which are also integrally embedded in the epoxy resin to have inner faces 16a thereof exposed at the medallion inner face 10a of insert 10, and to have the opposite faces thereof adjacent the outer face 14a of the plate 14, but inwardly spaced from the medallion outer face 10b of the insert 10. As an example, each magnet 16 may be one-half inch diameter by five thirty-seconds inch thick to provide a magnetic pull of one-half pound, so that a multiplicity of such magnets 16 having the inner faces 16a in contact with the bottom surface 11a of recess 11 will retain the medallion insert 10 tenaciously in place therein under all conditions of normal use of the mold in production for molding plastic mats. Removal of medallion insert 10, however, may be accomplished by use of a hand-grip device (not shown) provided with suction cup means engageable with smooth surface portions on the outer face of medallion insert 10.

The purpose of metallizing the epoxy resin materials of the insert 10 is to offset the heat insulating effect of epoxy resin, so that curing heat in insert 10 will be approximately the same as that of the drum-type mold 12.

Referring now to FIGS. 3 to 6, for practicing the method of the invention for making the medallion insert 10, an existing mat-forming, drum-type mold of the type referred to above, or an equivalent preformed metal mold, is provided with a recess 11 of requisite depth and shape adapted for complemental reception of the medallion insert previously described. The steps of the method then may include: (a) placing a lower layer 20 of fluid or pliable heat-conductive synthetic resin plastic, such as metallized epoxy resin in the bottom of recess 11 of curvate mold 11, to a depth of slightly less than the depth of the recess as shown in FIG. 3; (b) providing a thin, apertured rigid plate 14 of cold-rolled steel, and of size and shape approximating that of the required medallion insert, and pressing the same downwardly against the pliable epoxy lower layer 20 until the inner ends of three or more pre-adjusted set-screws 21, 21, threaded in plate 14, firmly engage the bottom surface 11a of recess 11, as shown in FIG. 4, in which plate 14 will be supported in predeterminately spaced relation to bottom surface 11a by the screws 21; (c) pressing the permanent disc magnets 16, 16 through the holes 15, 15 in plate 14, and through the lower layer 20 to displace the same, until the inner faces 16a of the magnets engage the bottom surface 11a of recess 11, without outwardly displacing plate 14, as shown in FIG. 4; (d) forming a middle layer 20a of fluid metallized epoxy resin above the plate 14, as necessary, to build up the insert to requisite gauge or thickness, as shown in FIG. 5; (e) after allowing the epoxy layers 20 and 20a to set and harden with the plate and magnets integrally embedded and bonded therein as a rigid medallion insert 10, threadedly adjusting the set-screws 21 with reference to plate 14 to separate insert 10 from the surface portions of the recess 11; (f) removing the set-screws 21 from the medallion insert 10, and buffing and otherwise dressing the surfaces of the epoxy resin portions of the insert 10 to provide for snug but accurate sliding fit of the insert in recess 11 to have the inner faces of the magnets unobstructedly exposed against bottom surface 11a; (g) providing a thin copper facing 18 with three-dimensional design configurations of the medallion, as by electroplating the same on a flexible elastic pattern cemented on a curved sheet of "Plexiglas" and chrome-plating the outer face of the shell; and (h) after finishing the top face of middle layer 20a to predetermined gauge, cementing facing 18 onto middle layer 20a, by an application of hardenable, metallized epoxy cement upper layer 20c which fills all spaces between the shell and middle layer 20a, as shown in FIG. 6. Upon hardening of said epoxy cement the resultant composite medallion insert 10 is ready for use by simply dropping the same in recess 11 of mold 12 to become magnetically attached therein as previously described.

The improved structure saves manufacturing costs in production of polyvinyl chloride floor mats by making it possible, by changing medallion insert 10, in a matter of seconds to convert a drum-type mold of given mat design to have distinctive medallions of different auto manufacturers, for example.

Modifications of the invention may be resorted to without departing from the spirit thereof or the scope of the appended claims.

What is claimed is:

1. A method of making a medallion or like insert for use with a plastic mat-forming mold of the type having a relief surface and a recess for complemental reception of said insert comprising the steps of depositing a layer of pliable thermosetting resin material in a recess corresponding to said recess of said mold; embedding an apertured rigid member in the still pliable resin material wherein said member contains at least one screw threaded through one of said apertures; embedding at least one permanent magnet in said resin material to present a face adjacent an inner wall of said recess; allowing said layer to harden into an insert releasing the hardened insert from said recess by tightening said screw against a bottom surface of said recess; and, adhering a medallion facing, comprising a relief surface, to the outer surface of said insert.

2. The method of claim 1 wherein said thermosetting resin material comprises an epoxy resin.

3. The method of claim 1 wherein said thermosetting resin material is loaded with heat transmitting metal particles.

4. A method of making a medallion or like insert for use with a plastic mat-forming mold of the type having a relief surface and a recess for complemental reception of said insert, comprising the steps of forming a first layer of pliable thermosetting resin material in a forming recess corresponding to said recess of said mold and of lesser thickness than the depth of said recess; placing an apertured, rigid member on said first layer; pressing at least one permanent magnet through one of said apertures of said member and through the still pliable thermosetting resin layer to present at least one inner face of said magnet adjacent an inner wall of said recess; threading at least one screw through one of said apertures and through the still pliable thermosetting resin layer into engagement with a bottom surface of said recess; forming a second layer of pliable thermosetting resin material in said forming recess over said first layer of resin material; allowing said first and said second layers to harden into an insert; releasing said hardened insert from said forming recess by tightening said screw against said bottom surface thereof; and, adhering a medallion facing, comprising a relief surface, to the outer surface of said insert.

5. The method of claim 4 wherein said thermosetting resin material comprises an epoxy resin.

6. The method of claim 4 wherein said thermosetting resin material is loaded with heat transmitting metal particles.

References Cited

UNITED STATES PATENTS

| | | | |
|---|---|---|---|
| 3,408,436 | 10/1968 | Cubitt | 18—44 XR |
| 3,474,498 | 10/1969 | Hoppes | 18—44 XR |

JOHN T. GOOLKASIAN, Primary Examiner

G. W. MOXON II, Assistant Examiner

U.S. Cl. X.R.

18—44; 156—303.1; 264—255, 334

PO-1050
(5/69)

UNITED STATES PATENT OFFICE
CERTIFICATE OF CORRECTION

Patent No. 3,530,022     Dated September 22, 1970

Inventor(s) Lamont D. Mallory

It is certified that error appears in the above-identified patent and that said Letters Patent are hereby corrected as shown below:

Column 2, line 55, the phrase "the insert 10" should read -- the medallion insert 10 --; line 56, the phrase "the insert 10" should read -- the medallion insert 10 --; lines 68 and 69, the phrase "recess 11 of curvate mold 11, to a depth" should read -- recess 11, to a depth --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents